United States Patent

Ohmi et al.

[11] Patent Number: 5,937,399
[45] Date of Patent: Aug. 10, 1999

[54] SEMICONDUCTOR INTEGRATED CIRCUIT

[75] Inventors: Tadahiro Ohmi; Tadashi Shibata; Koji Kotani, all of Miyagi-ken, Japan

[73] Assignees: Tadahiro Ohmi; Tadashi Shibata, both of Miyagi-Ken, Japan

[21] Appl. No.: 08/663,248

[22] PCT Filed: Nov. 29, 1994

[86] PCT No.: PCT/JP94/02001

§ 371 Date: Jun. 11, 1996

§ 102(e) Date: Jun. 11, 1996

[87] PCT Pub. No.: WO95/15581

PCT Pub. Date: Jun. 8, 1995

[30] Foreign Application Priority Data

Dec. 2, 1993 [JP] Japan ................................. 5-302918

[51] Int. Cl.$^6$ ................................................. G06F 15/18
[52] U.S. Cl. ................................. 706/33; 706/15; 706/26
[58] Field of Search ........................ 395/21, 24; 706/15, 706/26, 33

[56] References Cited

U.S. PATENT DOCUMENTS

| | | | |
|---|---|---|---|
| 5,521,858 | 5/1996 | Shibata | 365/185.03 |
| 5,539,329 | 7/1996 | Shibata | 326/39 |
| 5,661,421 | 8/1997 | Ohmi | 327/63 |
| 5,682,109 | 10/1997 | Ohmi | 327/57 |
| 5,706,403 | 1/1998 | Shibata et al. | 706/25 |

FOREIGN PATENT DOCUMENTS

| | | |
|---|---|---|
| 3-6679 | 1/1991 | Japan . |
| 6-112505 | 4/1994 | Japan . |

*Primary Examiner*—Tariq R. Hafiz
*Assistant Examiner*—Jason W. Rhodes
*Attorney, Agent, or Firm*—Baker & Daniels

[57] ABSTRACT

A semiconductor integrated circuit includes one or more neuron MOS transistors on a substrate. The MOS transistor comprises a semiconductor region of one conductivity type, source and drain regions of opposite conductivity type disposed in this region, floating gate disposed on an insulating film between the source and drain regions, and a plurality of input coupling electrodes making capacitive coupling with the floating gate through the insulating film, wherein the floating gate is connected to at least one switching device.

12 Claims, 7 Drawing Sheets

SEMICONDUCTOR INTEGRATED CIRCUIT

TECHNOLOGICAL FIELD

The present invention relates to a semiconductor integrated circuit. In more detail, the present invention relates to a semiconductor integrated circuit which is constructed from neuron MOS transistors.

BACKGROUND ART

In the field of semiconductor integrated circuits, the large scale integration of such circuits has made progress as a result of the miniaturization of the elements. When the elements are miniaturized, it is not merely the case that the operational speed of the elements increases, but the number of elements which can be placed on a single chip increases, so that the functions per chip can be increased. A good example of this is microprocessor LSI; in current leading edge microprocessor chips, the element dimensions are on the level of 0.5 microns, and the number of elements per chip reaches as high as several million. The cache memory and floating point decimal calculation unit and the like, which were conventionally placed on a separate chip from the microprocessor chip, have become able to be placed simultaneously on one microprocessor chip, since the circuit components themselves have become smaller as a result of the miniaturization of the elements, and this has played a great role in the improvement of computer performance.

However, in concert with the miniaturization of the elements and large scale integration, a number of problems have become apparent. One such problem is the hot carrier problem, in which, since a fixed power source voltage is applied to the minute elements, a strong electric field is generated within the elements, the accelerated carriers become hot carriers, and are injected into the gate oxide film, and the element characteristics tend to worsen. Furthermore, problems are also presented by difficulties in the layout and formation of wiring which is necessary to connect elements among the several million elements on a single chip. As a result of such problems, the present state is such that further miniaturization of the elements has become extremely difficult. Accordingly, there is little prospect for an improvement in the functions of the LSI chips in the future.

Such problems were solved by the invention of the neuron MOS transistor and logical circuits employing such neuron MOS transistors (inventors: Tadashi Shibata, Tadahiro Ohmi, Japanese Patent Application, First Publication, No. Hei 3-6679, and Japanese Patent Application No. Hei 3-83152). The neuron MOS transistor is a highly functional element possessing functions similar to those of a living nerve cell; it has a floating gate and a plurality of input coupling electrodes which are capacitively coupled with this floating gate, calculates a weighted average of the input signals from the plurality of input coupling electrodes at the floating gate level, and based on the results, the ON and OFF state of the transistor is controlled. In contrast to conventional transistors, which are termed 3 terminal devices in that the ON and OFF state of the current flowing between two terminals is controlled by means of a third terminal, the neuron MOS transistor is termed a 4 terminal device, in that a plurality of fourth terminals are provided, which are capable of controlling the method of control of the third terminal, which controls the ON and OFF state of the current flowing between two other terminals. Because the function of the element itself is high, if such an element is employed in a logic circuit, the number of elements or wirings necessary to realize a certain logical function is dramatically smaller than that in the case in which conventional CMOS logical circuits are employed. Furthermore, flexible signal processing, which is very difficult to achieve with circuits employing conventional transistors, in which a simple determination is made as to whether one input has a value of 0 or 1, and the ON and OFF state of the transistor is thus controlled, can be realized in a simple manner, and it is easily possible to construct flexible logical circuits, real-time rule-variable matching circuits, winner take all circuits, and circuits having high functions such as associative memory or the like. Furthermore, it is also a simple matter to realize functions which extract characteristics from a very large amount of data, and using such functions, a simplification and increase in speed of circuits is also expected even in the field of image data processing, such as letter recognition, or the detection of movement vectors in images or the like. In this way, the neuron MOS transistor is a completely new device having a possibility of giving rise to completely novel circuit technologies in the realm of ultra high speed and ultra high function LSI realization.

However, since the neuron MOS transistor has a floating gate, it has the following serious problems with respect to reliability. The neuron MOS transistor handles multivalent voltage signals at the floating gate level. That is to say, the difference in potential between the ground potential (GND) and the power source voltage ($V_{DD}$) is allocated so as to be divided among a plurality of logical levels, and threshold operations are conducted. If the power source voltage is considered to be fixed, then the difference in voltage between a certain logical level and nearby logical levels, that is to say, the logical swing, becomes smaller as the number of multivalent levels becomes larger, and this leads to an undesirable reduction in the noise margin. Accordingly, in circuitry employing neuron MOS transistors, errors in the threshold value of the transistors must be controlled so as to be sufficiently small in comparison with a binary logic circuit in order to prevent mistakes in the operation of the circuitry.

However, as a result of the variation in the amount of charge present in the floating gates, the error in the threshold values of neuron MOS transistors is in all probability greater than the error in the threshold values of common MOS transistors. Table 1 shows the threshold values in 9 neuron MOS transistors on a single wafer immediately after the manufacture thereof, as seen from the input coupling electrodes. In fact, the variation encompasses a range of 9V, from −7.95V to +1.02V. Since the variation in the threshold values of common MOS transistors is approximately 0.2V, this represents a variation which is 45 times greater than that in common MOS transistors. The charge which is injected into the floating gate of a MOS transistor does not dissipate of its own accord, as a result of the extremely high insulating resistance, but remains unchanged, and exerts a direct influence on the threshold value. The large variation in the threshold value of neuron MOS can be traced to irregularities within the wafer surface during the manufacturing process of the device, such as reactive ion etching or sputtering or the like, and this variation results from the charge, irregular from device to device, which remains in the floating gate.

TABLE 1

| Transistor Number | Threshold Value (V) |
|---|---|
| 1# | 1.017 |
| 2# | 0.259 |
| 3# | 0.081 |
| 4# | −1.962 |
| 5# | −3.193 |
| 6# | −3.716 |
| 7# | −4.602 |
| 8# | −7.209 |
| 9# | −7.949 |

However, the initial variation in the threshold values after the production of the devices can be eliminated to a certain extent by means of a procedure of ultraviolet (UV) irradiation or the like. Table 2 shows the threshold values after the irradiation with UV light for a period of 1,000 seconds of the devices having varying threshold values after the manufacturing processes thereof which were shown in Table 1. The variation is reduced to 0.17V. However, even at this level, this is insufficient for neuron MOS transistors handling multivalent signals, and thus the number of multivalent levels which can be handled by the neuron MOS transistor are dramatically restricted.

TABLE 2

| Transistor Number | Threshold Value (V) |
| --- | --- |
| 1# | 2.205 |
| 2# | 2.118 |
| 3# | 2.056 |
| 4# | 2.219 |
| 5# | 2.150 |
| 6# | 2.078 |
| 7# | 2.225 |
| 8# | 2.164 |
| 9# | 2.058 |

Furthermore, what is critical with respect to the neuron MOS transistor is the change over time in the threshold value which occurs simultaneously with the operation of the device. This occurs primarily as a result of the injection of hot carriers into the floating gate. In standard MOS transistors, almost all of the hot carriers injected into the gate oxide film pass through this gate oxide film and escape to the gate electrodes, so that the amount of charge which is captured within the oxide film and thus alters the threshold value is only a very small part of the total amount of charge injected. However, in the neuron MOS, almost all of the injected charge remains within the floating gate, so that even with a very small amount of injected charge, the threshold value of the neuron MOS transistor changes dramatically. It is thus not merely the case that the neuron MOS transistor has an allowable error margin in the threshold values which is smaller than that of the standard MOS transistor, but also the amount of change in the threshold value as a result of hot carrier injection is much larger.

The floating gate type EPROM, which has a floating gate in the same way as the neuron MOS transistor, is a device which simply determines binary values of 0 or 1, and the allowable change over time in the threshold value thereof is large (on the level of several volts). Accordingly, it is possible to ensure the data maintenance characteristics over a number of years, and such devices have been placed into practical application. In contrast, the neuron MOS transistor is a device which handles multivalent signals at the floating gate, as described above, the allowable change in the threshold values is small, and errors in operation are likely to be caused as a result of even small amounts of charge injection.

As described above, although the neuron MOS transistor is highly functional, it has a large defect in that the reliability thereof is extremely poor. Furthermore, in order to take advantage of the high functionality of the device, it is necessary to increase the number of inputs of the neuron MOS transistor; however, as the number of inputs increases, the logical swing is reduced, and the reliability is further worsened, so that it has not been a simple matter to increase the number of inputs.

The present invention has as an object thereof to provide a highly functional semiconductor integrated circuit employing this neuron MOS transistor, in which a switch is added to the floating gate of the neuron MOS transistor, and the charge remaining in the floating gate or injected into the floating gate is rapidly eliminated via this switch, and thereby, the reliability of the neuron MOS transistor is improved, so that it becomes possible to make use of a neuron MOS having a large number of simultaneous inputs.

DISCLOSURE OF THE INVENTION

The semiconductor integrated circuit in accordance with the present invention includes one or more neuron MOS transistors on a substrate, the neuron MOS transistors comprising a semiconductor region of one conductivity type, source and drain regions of an opposite conductivity type provided within this region, a floating gate provided via an insulating film in a region separating the source and drain regions, and a plurality of input coupling electrodes which are capacitively coupled via an insulating film with the floating gate; wherein, in the neuron MOS transistor, the floating gate is connected with a predetermined signal line via one or more switch elements, and after a first signal group has been inputted into the plurality of input coupling electrodes of the neuron MOS transistor and these have passed through the switch elements, the switch elements are cut off, and by means of this, the floating gate of the neuron MOS transistor is placed in an electrically floating state, and after this, a second signal group is inputted into the plurality of input coupling electrodes of the neuron MOS transistor, and thereby control is exerted so as to conduct calculations.

Function

In the present invention, a switch is added to the floating gate of an MOS transistor. One end of this switch is connected to a predetermined signal line, and by means of appropriately controlling this switch, it is possible to remove the surplus charge remaining in the floating gate. Accordingly, it is possible to prevent the change over time in the threshold value of the neuron MOS transistor, and it is thus possible to improve the reliability of the neuron MOS integrated circuit. Additionally, because it is possible to suppress to a small level fluctuations in the threshold value, it is possible to increase the maximum allowable number of inputs of the neuron MOS transistor, and thus to realize a more highly functional neuron MOS integrated circuit.

| (Description of the References) | |
|---|---|
| 101 | P channel neuron MOS transistor, |
| 102 | N channel neuron MOS transistor, |
| 103 | floating gate, |
| 104, 105, 106 | input coupling electrodes, |
| 107, 108, 109, 110 | switches, |
| 111 | output. |

BEST MODE FOR CARRYING OUT THE INVENTION

Hereinbelow, the present invention will be explained based on embodiments; however, it is of course the case that the present invention is in no way limited to the embodiments described.

(First Embodiment)

Figure 1:
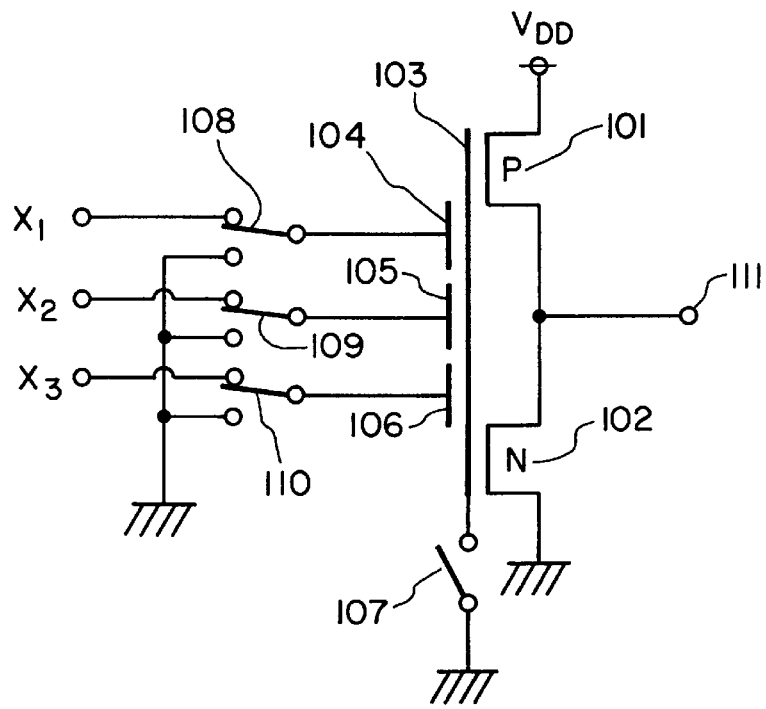
FIG. 1 is a schematic structural circuit diagram showing a first embodiment of the present invention.

FIG. 1 is a structural diagram of a circuit showing a first embodiment of the present invention. This circuit calculates majority logic with respect to three binary signal inputs $X_1$, $X_2$, and $X_3$. That is to say, if two or more of these three inputs have a value of 1, the circuit outputs a value of 0, while when one or fewer of the inputs have a value of 1, the circuit outputs a value of 1. In the Figure, reference 101 indicates a P channel neuron MOS transistor and reference 102 indicates a N channel neuron MOS transistor. These neuron MOS transistors 101 and 102 form a three input neuron MOS inverter together with a common floating gate 103 and three input coupling electrodes 104, 105, and 106, which are capacitively coupled with the floating gate 103. It will be assumed that the coupling capacities of the input coupling electrodes 104, 105, and 106 with the floating gate are equivalent are represented by $C_C$. Reference 107 indicates a switch which is interposed between floating gate 103 and the ground potential power source line; when a first control signal has a value of 1, this switch conducts. References 108, 109, and 110 indicates switches which are placed between, respectively, input coupling electrodes 104, 105, and 106, and inputs $X_1$, $X_2$, and $X_3$; these are controlled by a second control signal, and have a structure such that when the second control signal has a value of 0, the switches connect the floating gates and the inputs, while when the second control signal has a value of 1, the switches connect the floating gate with the ground potential.

In general, the potential $\Phi_F$ of the neuron MOS transistor is expressed by the following formula.

(Arithmetical Formula 1) (1)

$$\Phi_F = \frac{\sum_{i=1}^{n} C_i V_i}{C_{TOT}} + \frac{Q_F}{C_{TOT}}$$

Here, $C_i$ represents the coupling capacity of the input coupling electrode numbered i, $V_i$ represents the potential of the input coupling electrode numbered i, and $Q_F$ indicates the amount of charge present in the floating gate. $C_{TOT}$ indicates the total capacity with respect to the floating gate, and is expressed by the following formula.

(Arithmetical Formula 2) (2)

$$C_{TOT} = C_0 + \sum_{i=1}^{n} C_i$$

Here, $C_0$ represents the total parasitic capacity with respect to the floating gate of the gate capacity of the transistor, the capacity between the floating gate and the substrate, or the like.

The potential $\Phi_{103}$ of floating gate 103 in the circuit shown in FIG. 1 is given by the following formula:

(Arithmetical Formula 3) (3)

$$\Phi_{103} = \frac{C_C V_{104} + C_C V_{105} + C_C V_{106}}{C_{TOT}} + \frac{Q_{103}}{C_{TOT}}$$

Here, $V_{104}$, $V_{105}$, and $V_{106}$ represent, respectively, the potentials of input coupling electrodes 104, 105, and 106, and $Q_{103}$ represents the charge present in the floating gate 103. Now, if the total parasitic capacity $C_0$ with respect to the floating gate 103 is assumed to be small enough in comparison with the coupling capacity $C_C$ that it can be ignored, then the floating gate potential $\Phi_{103}$ is given by the following formula:

(Arithmetical Formula 4) (4)

$$\Phi_{103} = \frac{V_{104} + V_{105} + V_{106}}{3} + \frac{Q_{103}}{3C_C}$$

The first term on the right hand side gives the average value of the three inputs, while the second term represents an offset value. Now, if the floating gate charge $Q_{103}$ is presumed to be 0, then the floating gate potential $\Phi_{103}$ has a value of 0 when all three inputs have a value of 0, has a value of $V_{DD}/3$ when only one input has a value of 1, has a value of $2V_{DD}/3$ when 2 inputs have a value of 1 and only one input has a value of 0, and has a value of $V_{DD}$ when all three inputs have a value of 1. However, the logical state of 0 corresponds to 0V, while the logical state of 1 corresponds to $V_{DD}$. If the inversion threshold value, as seen from floating gate 103, of an CMOS inverter comprising a PMOS transistor 101 and a N channel MOS transistor 102 is set to $V_{DD}/2$, then the output of the CMOS inverter, that is to say, the output 111 of the majority logic calculation circuit, has value of 1, that is to say, the potential thereof is $V_{DD}$, when none of the three inputs or one of the three inputs has a value of 1, and when 2 or more of the inputs has a value of 1, the CMOS inverter inverts, and outputs a value of 0. This is a true majority function calculation.

In the above explanation, it was assumed that the floating gate charge $Q_{103}$ had a value of 0 and thus could be ignored; however, in actuality this charge may have a value other than 0, and this value may change over time as a result of hot carrier injection or the like during MOS transistor operation. Now, it will be assumed that the floating gate charge $Q_{103}$ has changed in value over time and has reached a value of $C_C V_{DD}$. The potential $\Phi_{103}$ of the floating gate 103 is given by the following formula:

(Arithmetical Formula 5) (5)

$$\Phi_{103} = \frac{V_{104} + V_{105} + V_{106}}{3} + \frac{V_{DD}}{3C_C}$$

That is to say, the potential of the floating gate is offset by a value of $V_{DD}/3$. Accordingly, the potential $\Phi_{103}$ of the floating gate has a value of $V_{DD}/3$ when the number of the three inputs having a logical state of 1, that is to say, when the number of voltages $V_{104}$, $V_{105}$, and $V_{106}$ having a value of $V_{DD}$, is 0, and when the number of such inputs is 1 or more, the potential reaches a value of $2V_{DD}/3$ or more. Accordingly, the circuit only outputs a value of 1 when the number of inputs having a value of 1 is 0, and when the number of such inputs is 1 or more, the circuit outputs a value of 0. This is not a normal majority logic calculation.

In this way, when an excessive charge is stored in the floating gate, the circuit will experience errors in operation. The switch 107 in the circuit of FIG. 1 is provided in order to remove this excessive charge. The operation thereof is as given below. By means of placing the switch 107 in the ON position, the floating gate 103 is forcibly biased at the ground potential. Simultaneously, the ground potential is inputted into the input coupling electrodes 104, 105, and 106 as a first signal group. At this time, a voltage is not applied to the coupling capacity between the floating gate and the input coupling electrodes, and a charge is not generated in the electrodes having capacitive coupling. If the parasitic capacity $C_0$ with respect to the floating gate 103 is assumed to be sufficiently small in comparison with coupling capacity $C_C$, so that it can be ignored, the charge within the floating gate will be 0. In this state, if the switch 107 is moved to the OFF position, the resetting of the charge within the floating gate 103 will be completed. Switches 108, 109, and 110 are provided in order to forcibly set, respectively, the input coupling electrodes 104, 105, and 106 to the ground potential. After this, switches 108, 109, and 110 are changed over, and the circuit inputs $X_1$, $X_2$, and $X_3$ are applied to the input coupling electrodes as a second signal group, and thereby accurate calculations may conducted in a state in which there is no excess charge in the floating gate.

As described above, when a neuron MOS circuit which is constructed in such a manner that a switch is added to the floating gate is employed, the variation in the threshold values of the neuron MOS transistor resulting from the charge remaining in the floating gate immediately after the device manufacturing processing, and errors in operation of the circuit resulting from this, can be prevented. Additionally, during the operation of the circuit, as well, if a resetting operation of the floating gate charge is appropriately carried out by means of the floating gate switch, then the problems of change over time in the threshold value as a result of the injection of hot carriers generated during device operation into the floating gate, and the operational errors of the circuit which are caused as a result, can be completely solved. A completely floating floating gate to which no floating gate switch is added has an extremely high insulation resistance, so that during device operation, there is no chance that the floating gate charge will increase or decrease as a result of a mechanism other than that of hot carrier injection, for example, as a result of a leakage current or the like. However, by means of adding a floating gate switch, an increase or decrease in the floating gate charge is probably more to be expected as a result of a leakage current passing through the floating gate switch than as a result of hot carrier injection. This notwithstanding, the leakage current of a switch commonly employed in an MOS transistor is on the order of femto-($10^{-15}$) amperes, so that if it is presumed that a capacity of several tens of femtofarads, which is a common storage capacity in DRAMs, is employed, then the charge maintenance characteristics for periods on the level of milliseconds can be sufficiently guaranteed. Accordingly, it is sufficient if the floating gate charge reset operation accomplished by means of the floating gate switch is executed during periods on the level of milliseconds. As is the case with the refresh cycle of DRAMS, the most common control method is one in which a reset cycle is provided at intervals on the level of milliseconds, and the circuit is operated in a free run manner during periods other than the reset cycles. However, as in the case of multi input neuron MOS transistors, in cases in which accuracy is required in the calculations carried out by means of the floating gate potential, control methods may also be employed in which the reset cycle intervals are made shorter, or a reset operation is executed each time immediately prior to conducting calculations. That is to say, with respect to the reset cycle, this is best determined in view of the purpose of use and the like, and it is of course the case that any cycle period may be employed.

In the circuit shown in FIG. 1, in order that charge may not remain within the floating gate, after switch 107 is completely opened and the floating gate enters a floating state, it is necessary the switches 108–110 be changed over. The reason for this is that if switch 108 or switch 109 or switch 110 is first changed over and thus an input signal is applied first to input coupling electrode 104, or 105, or 106, then voltage is applied to the input coupling capacity, and charge passes through switch 107 and flows into (out of) the floating gate. For this reason, switch 107, and switches 108, 109, and 110, should be driven by means of control signals having different timings. However, in consideration of the transmission delay and the like of the wiring, if the timing at which switch 107 is opened is delayed so as to be after that of switches 108, 109, and 110, then the same control signal may be employed. Furthermore, if the input signals are so controlled as to definitely have a fixed potential, for example, the ground potential, during the reset operation, then switches 108, 109, and 110 need not be provided. The contact point with which the floating gate 103 is connected via the switch 107 may be a contact point connected with a power source at low impedance; it need not be the ground potential. For example, an operation is possible for the resetting of the floating gate charge to 0 in which, during reset, input coupling electrodes 104, 105, and 106 are set to $V_{DD}$, and floating gate 103 is also set via switch 107 to $V_{DD}$. In such a case, the contact point connected with the floating gate 103 by switch 107 is the $V_{DD}$ line. Commonly, the operation in which the floating gate charge is reset to 0 need only be one in which, during resetting, the input coupling electrodes and floating gate are set to the same potential via a low impedance path; this potential itself may have any value. Connection to a predetermined power source or a predetermined signal line at low impedance is desirable in order to rapidly accomplish the resetting operation; however, depending on the purpose, connection may also be made via, for example, a high impedance element.

Furthermore, there is are resetting procedures in which, during resetting, the input coupling electrodes and the floating gate are set to differing potentials. Because a potential difference exists, a certain amount of charge remains in the floating gate after resetting. However, if the difference in potential between the input coupling electrodes and the floating gate electrode is identical each time during resetting, then precisely the same amount of charge remains in the floating gate each time, and it is possible thus to correct the change over time in the floating gate charge resulting from hot carrier injection. That is to say, resetting each time with same potential is all that is required in order to reset the changes over time in the threshold value. Additionally, by means of resetting which imparts a difference in potential, it is also possible to impart, by design, an offset to the floating gate potential. For example, if resetting is conducted such that the input coupling electrodes 104, 105, and 106 are reset to the ground potential, while floating gate 103 is reset to $V_{DD}/3$, then the floating gate will have an offset of $V_{DD}/3$. This is the same as if an amount of charge equal to $C_C V_{DD}$ remained in the floating gate, and as described in the example given above, only if none of the three inputs have a value of 1, the circuit outputs a value of 1, while if one or more of these inputs has a value of 1, the circuit outputs a value of 0. Furthermore, if on the other hand resetting is conducted so that the floating gate 103 is reset to the ground potential, while the input coupling electrodes 104, 105, and 106 are all biased to $V_{DD}/3$, then if 2 or fewer of the 3 inputs have a value of 1, the circuit will output a value of 1, while if all the inputs have a value of 1, the circuit will output a value of 0. This is not a majority function; however, if the realization of such a function is desirable, this is an effective method to accomplish this. With respect to intermediate potentials such as $V_{DD}/3$ or the like, these may be supplied directly from a power source outputting a voltage of $V_{DD}/3$, or such a voltage may be generated using a resistance type divider circuit or the like which is connected between $V_{DD}$ and the ground potential.

In the example shown here, resetting was conducted by applying the same voltage to all of the plurality of input coupling electrodes; however, differing voltages may also be employed. Only the average value of the potentials of each input coupling electrode, after weighting with capacitive coupling, is important. For example, with respect to the resetting operation described above in which a potential of $V_{DD}/3$ was applied to all 3 input coupling gates having equal coupling capacities, the same operation could be conducted by applying $V_{DD}$ to one of the input coupling electrodes, and applying the ground potential to the remaining 2 electrodes. That is to say, the average value need only reach a predetermined level.

Figure 2:
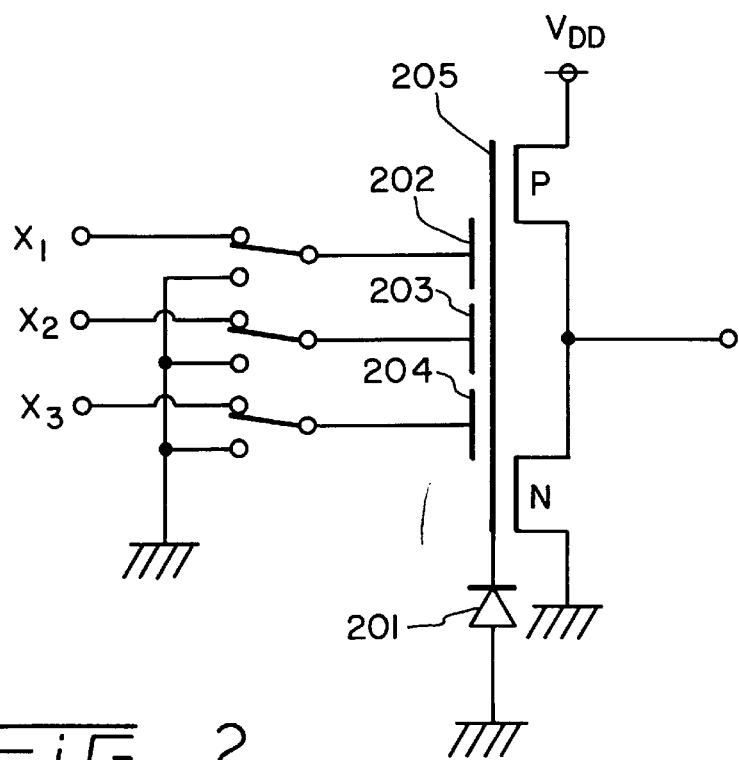
FIG. 2 is a schematic structural circuit diagram showing the case in which a PN diode is employed as the switch element.

Commonly, single transistors or CMOS switches or the like are used as the switch elements connected to the floating gate. However, there are also cases in which a diode is employed. For example, if PN diode 201 is employed as shown in FIG. 2, then a change over time in the floating gate charge in a negative direction (the reduction of a positive charge or the increase in a negative charge) can be reset. In the circuit shown in FIG. 2, a resetting operation may be conducted by setting the potentials of the input coupling electrodes 202, 203, and 204 to the ground potential. During resetting, the potential of the floating gate 205 is automatically biased at the boundary potential between the ON and the OFF in the forward direction of the PN diode. That is to say, if the turn-on voltage of the diode is set to $V_{ON}$, this potential is $-V_{ON}$. Next, when a positive voltage other than the ground potential is applied to input coupling electrodes 202, 203, and 204, and the circuit conducts calculation operations, the potential of the floating gate 205 is greater than $-V_{ON}$, and the diode 201 is in an OFF state (the switch is in an OFF state), and floating gate 205 literally enters an electrically floating state. If it is assumed that, during this calculation operation, a negative charge is injected into the floating gate 205, then the floating gate potential will effectively shifted in a negative direction. However, at the subsequent reset cycle, the input coupling gates are all reset to the ground potential, and an attempt is made to change the potential of the floating gate to a potential which is more negative than $-V_{ON}$; however, the PN diode 201 immediately turns on (the switch enters an ON state), and the floating gate potential is clipped off at $-V_{ON}$. As a result of this effect, it is possible to reset the negative charge injected into the floating gate during calculations. In the same manner, by means of connecting the PN diode between $V_{DD}$ and the floating gate, it is possible to reset the changes over time in a positive direction of the floating gate charge (an increase in the positive charge or a decrease in the negative charge).

In the present embodiment, a neuron MOS inverter circuit was used as an example; however, it is of course the case that the preceding discussion is also broadly applicable to individual neuron MOS transistors or circuits employing neuron MOS transistors.

(Second Embodiment)

Figure 3:
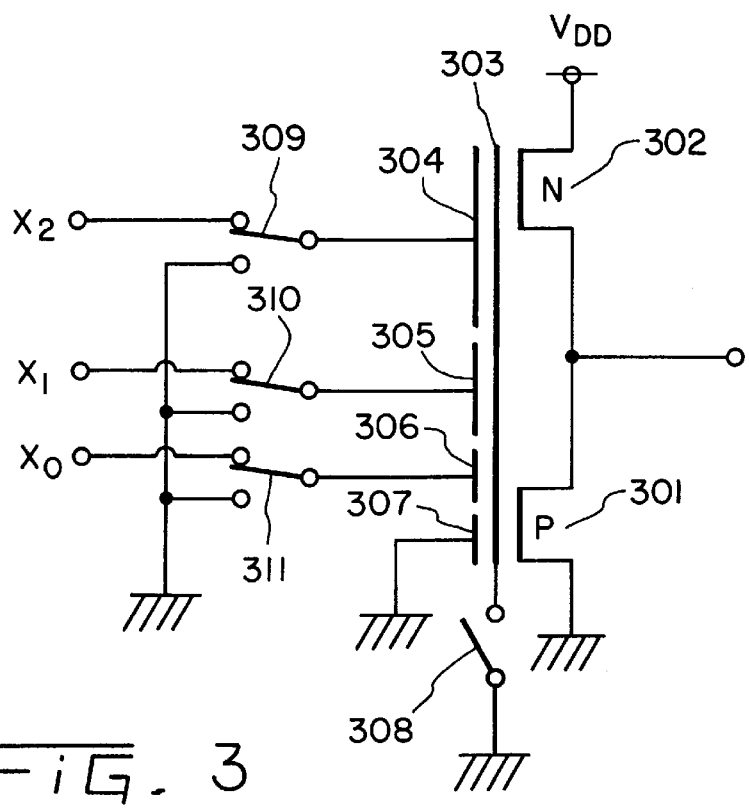
FIG. 3 is a schematic structural circuit diagram showing a second embodiment of the present invention.

FIG. 3 shows a second embodiment of the present invention. This circuit conducts a digital/analog signal conversion with respect to a three bit digital signal input of $X_0$, $X_1$, and $X_2$, and outputs an analog voltage signal. In the Figure, reference 301 indicates a depression type P channel neuron MOS transistor, while reference 302 indicates a depression type N channel neuron MOS transistor. These neuron MOS transistors 301 and 302 differ from the neuron MOS transistors in the inverter circuit in that the positions with respect to $V_{DD}$ and ground electrode are reversed, and that these form a 4-input neuron MOS source follower circuit with a common floating gate 303 and 4 input coupling electrodes 304, 305, 306, and 307 which are capacitively coupled with this floating gate 303. The capacitive coupling ratio of the input coupling electrodes 304, 305, 306, and 307 with the floating gate is 4:2:1:1. This capacitive coupling ratio of the input coupling electrodes 304, 305, and 306 forms a binary weight. The input coupling electrode 307 serves to apply an offset to the potential of the floating gate 303; this is always set to the ground potential. Other details of the structure are identical to those given in the first embodiment, so that they are omitted here. The control of this circuit is also identical to that of embodiment 1.

In order to conduct the resetting of the excess charge in the floating gate, the input coupling electrodes 304, 305, and 306 are first set to the ground potential, and switch 308 is placed in the ON position; after this, switch 308 is placed in an OFF position, and floating gate 303 is placed in an electrically floating state. When switches 309, 310, and 311 are changed over and 3 bit digital signal $X_2$, $X_1$, $X_0$ is applied to the input coupling gates 304, 305, and 306, then the potential $\Phi_F$ of the floating gate 303 attains the value expressed in the following formula as a result of of the input coupling capacities which were subjected to binary weighting.

(Arithmetical Formula 6) $$\Phi_F = \frac{4X_2 + 2X_1 + X_0}{8} \tag{6}$$

This source follower circuit comprising neuron MOS transistors 301 and 302 is capable of outputting a voltage essentially identical to the potential of the floating gate 303, so that as a result, the digital/analog conversion output shown in Formula 6 can be obtained.

In the present embodiment, by means of adding a switch to the floating gate, the present invention is capable of resetting the excess charge in the floating gate, and this is an example which shows the possibility of application not merely to the inverter circuit shown in Embodiment 1, but more broadly to circuits employing neuron MOS transistors.

In the present embodiment, the floating gate is connected with the ground potential via the switch 308, and the potential which is applied to the input coupling gates during resetting is also the ground potential; however, as in the case of Embodiment 1, it is of course the case that it is possible to execute floating gate resetting using a variety of potentials.

Furthermore, this circuit may operate in the following manner: in the state in which input signals $X_2$, $X_1$, and $X_0$ are inputted into input coupling electrodes 304, 305, and 306, after switch 308 is switched to the ON position and the charge within the floating gate is reset, the switch 308 is switched to the OFF position, and when the second input signals $X_{2'}$, $X_{1'}$, and $X_{0'}$ are inputted into input coupling electrodes 304, 305, and 306, the potential $\Phi_F$ of the floating gate 303 is given by the following formula:

(Arithmetical Formula 7) (7)

$$\Phi_F = \frac{4X_2' + 2X_1' + X_0'}{8} + \frac{4X_2 + 2X_1 + X_0}{8}$$

This signal represents the weighted average value of the first signals subtracted from the weighted average value of the second signals. In the present circuit, which has a source follower structure, it is possible to output the potential of the floating gate in an unchanged form, so that the present circuit is capable of outputting an analog value corresponding to the difference between two signals. Using this function, the addition and subtraction of analog values can be freely accomplished, so that this is useful in data processing circuits for image processing and the like.

(Third Embodiment)

Figure 4:
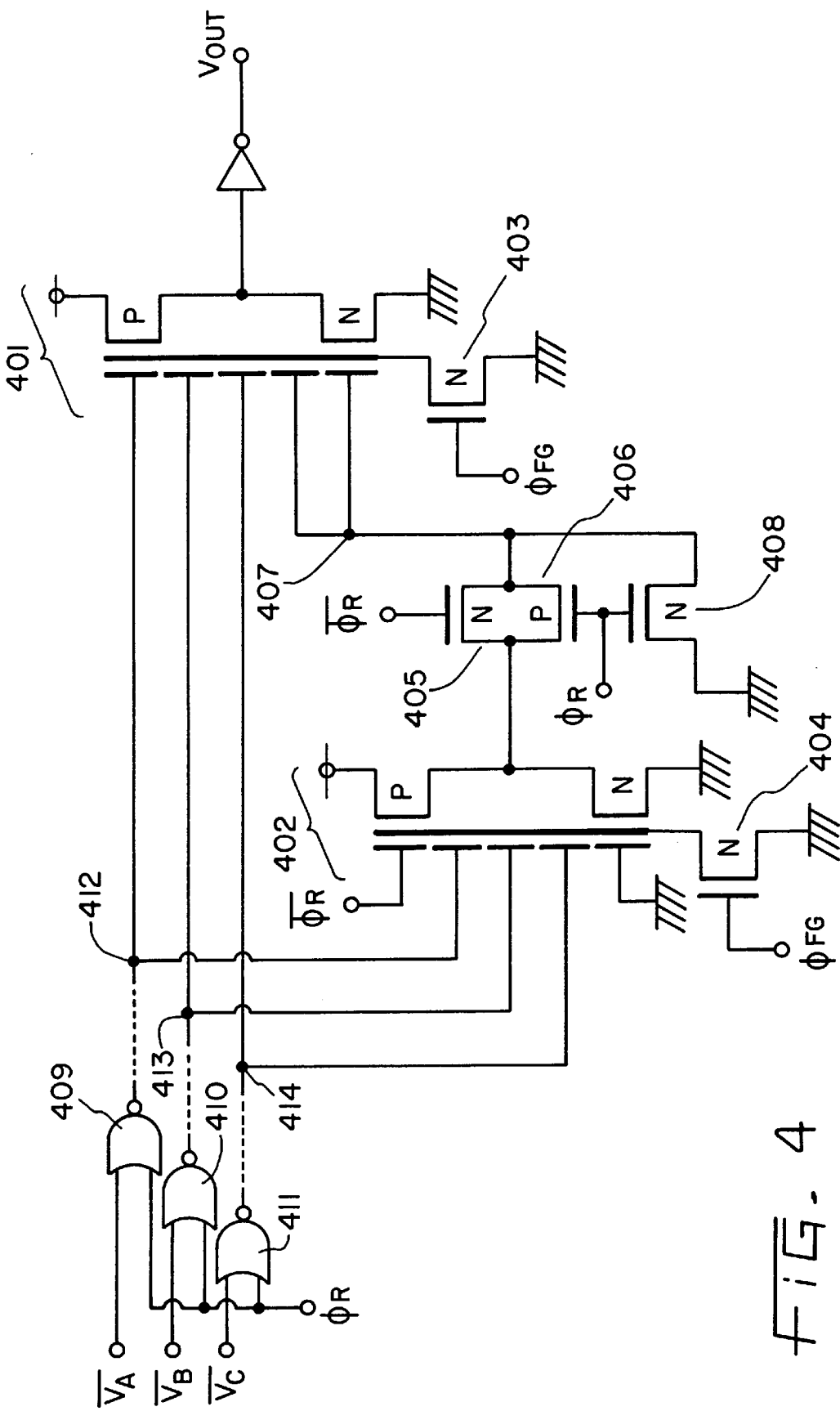
FIG. 4 is a schematic structural circuit diagram showing a third embodiment of the present invention.

FIG. 4 shows a third embodiment of the present invention. Here, the present invention is applied to a logical circuit employing neuron MOS transistors (inventors: Tadashi Shibata, Tadahiro Ohmi, Japanese Patent Application, No. Hei 3-83152). This circuit calculates the exclusive OR (XOR) of 3 binary input signals $V_A$, $V_B$, and $V_C$. References 401 and 402 represent neuron MOS inverters having five input coupling electrodes having equivalent coupling capacities. In this neuron MOS logical circuit, inverter 401 is the main inverter, while inverter 402 is termed the preinverter. Using neuron MOS transistors, it is possible to realize all logical functions using one main inverter in combination with a plurality of preinverters.

References 403 and 404 represent N channel MOS transistors which are employed as switch elements for the resetting of the excess charge in the floating gates of, respectively, neuron MOS inverters 401 and 402. These N channel MOS transistor switches are controlled by means of a control signal $\Phi_{FG}$. The N channel MOS transistor 405 and P channel MOS transistor 406 are connected between the output of the neuron MOS inverter 402 and a contact point 407 at which two of the input coupling electrodes of the neuron MOS inverter 401 are aggregated; these transistors form a CMOS switch which conducts cutoff. Reference 408 indicates a N channel MOS transistor switch which serves to connect contact point 407, that is to say, two of the input coupling electrodes of neuron MOS inverter 401, to a ground potential electrode. These switches are controlled by means of a control signal $\Phi_R$. References 409, 410, and 411 all indicate NOR gates.

The resetting of the excess charge in the floating gate in this circuit is conducted by means of setting all of the input coupling electrodes of the neuron MOS inverters 401 and 402, and the floating gate, to the ground potential, and after this, the floating gate is placed in an electrically floating state, and calculations are conducted by means of introducing the input signals of the circuit into the input coupling electrodes. Concretely speaking, the reset cycle is initiated when the value of control signals $\Phi_{FG}$ and $\Phi_R$ changes from 0 to 1. During resetting, the NOR gate of the input portion outputs a value of 0, that is to say, the ground potential, irrespective of the input signals $V_A$, $V_B$, and $V_C$. Accordingly, the contact points 412, 413, and 414, which form the common inputs of the preinverter 402 and the main inverter 401, are forcibly set to the ground potential. Of the other two input coupling electrodes of the neuron MOS preinverter 402, one must be biased at the ground potential during calculations, while the other is biased at $V_{DD}$; however, during resetting they both must be biased at the ground potential. Accordingly, an inversion signal of the control signal $\Phi_R$ is inputted into the input coupling electrodes which are to be biased at $V_{DD}$ during calculations. By means of the above, the input coupling electrodes of the neuron MOS inverter 402 are all set to the ground potential during resetting. The floating gate of the neuron MOS inverter 402 is forcibly grounded by the switching transistor 404 while control signal $\Phi_{FG}$ has a value of 1.

In this way, the resetting of the charge within the floating gate of the neuron MOS inverter 402 is accomplished. Because the floating gate of the neuron MOS inverter 402 is grounded, the output thereof is $V_{DD}$. In this state, when the input coupling electrodes of the neuron MOS inverter 401 are connected, the resetting of the charge in the floating gate of neuron MOS inverter 401 can not be accomplished. Accordingly, during resetting, the connection between the output of the neuron MOS inverter 402 and the input coupling electrode contact point 407 of the neuron MOS inverter 401 is cut off by means of a CMOS switch comprising transistors 405 and 406. Furthermore, by means of the transistor switch 408, the contact point 407 is forcibly biased at the ground potential. The floating gate of the neuron MOS transistor 401 is also grounded by means of switch transistor 403. By means of the above, the resetting of the charge in the floating gate of the neuron MOS inverter 401 is executed.

Figure 5:
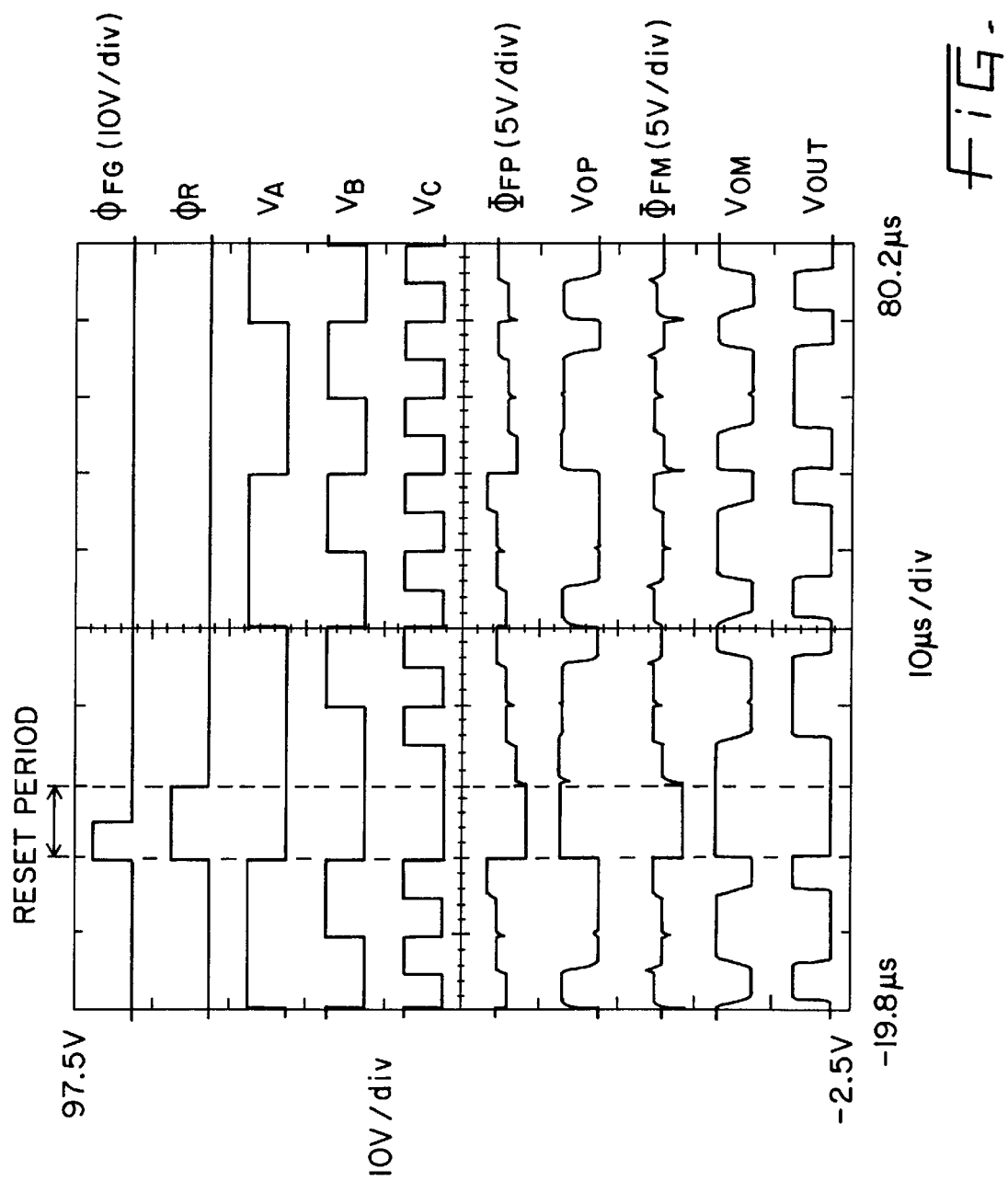
FIG. 5 shows the results of a measurement of the internal signal wave form of the inputs and outputs of a circuit in accordance with a third embodiment of the present invention.

FIG. 5 shows the results of a measurement of the input and output signal wave form and internal signal wave form of the circuit shown in FIG. 4 in accordance with the present embodiment. $\Phi_{FP}$ and $V_{OP}$ represent the floating gate potential wave form of the neuron MOS inverter 402, and the output wave form thereof. In the same way, $\Phi_{FM}$ and $V_{OM}$ represent the floating gate potential wave form of neuron MOS inverter 401, and the output wave form thereof. It can be seen that during the reset period, the potential of the floating gate is set to the ground potential. When the reset period ends, the potential of the floating gate changes in response to changes in the input signals, and it can be seen the output also changes. The output $V_{OUT}$ of the circuit represents an accurate exclusive OR (XOR) with respect to the three inputs $V_A$, $V_B$, and $V_C$.

With respect to the end of the reset cycle, the value of control signal $\Phi_{FG}$ first drops, and then when the value of $\Phi_R$ also drops, the cycle comes to an end. The two types of control signals $\Phi_{FG}$ and $\Phi_R$ are employed; however, in consideration of the transmission delay and the like of the wiring, if the structure is such that the timing at which the floating gates switches 403 and 404 are opened is delayed with respect to that of the other switches, the same control signal may be employed.

The switch elements employed in the present embodiment were N channel MOS transistors, CMOS switches, and NOR gates; however, this is not necessarily so limited, and insofar as the elements are capable of executing a switching function, these functions may be carried out by slight modifications in the circuit wiring which do not affect the essence of the circuit operation of the present invention.

In the case in which a complicated logical circuit is to be constructed, it is possible to conduct the cascade connection of a plurality of logical circuits. When the cascade connection of neuron MOS logical circuits such as those shown in the present embodiment is conducted, the input portion NOR gates 409, 410, 411, and the like are not necessary in later stage circuits. The reason for this is that the neuron MOS logical circuit to which the method depicted in the present embodiment is applied outputs a value of 0, that is to say, the ground potential, during resetting. The floating gate of the main neuron MOS inverter 401 is connected by means of switch 403, and the output thereof is $V_{DD}$. This main inverter output is normally logically inverted by means of a CMOS inverter and forms the output of the entire circuit, so that the output of the entire circuit is the ground potential. Accordingly, the NOR gates of the input portion are only necessary in portions which connect conventional logical circuits with neuron MOS logical circuits depicted in the present embodiment to which the present invention has been applied.

Here, a neuron MOS logical circuit which calculated a three input XOR function was used as an example, and a single embodiment of the present invention was explained; however, the present invention is not limited to a three input XOR function, but may be applied broadly to all neuron MOS logic circuits. Furthermore, in the present embodiment, a resetting method was discussed in which both the input connecting electrodes of the neuron MOS and the floating gate were biased at the ground potentials; however, it is of course the case that a method may also be employed in which resetting is conducted at a potential of $V_{DD}$, and may other variations are also possible.

(Fourth Embodiment 4)

Figure 6:
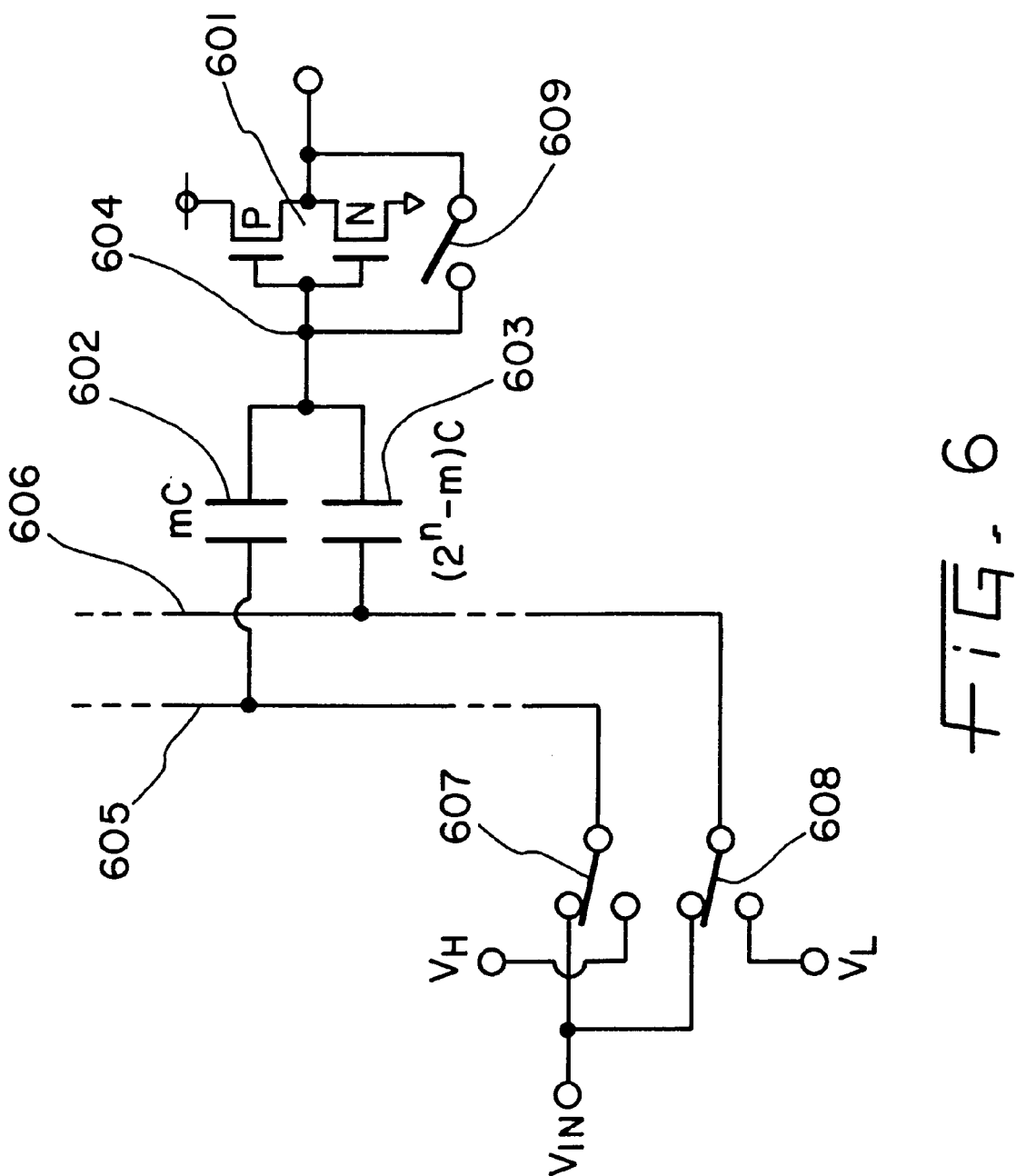
FIG. 6 is a schematic structural circuit diagram showing a fourth embodiment of the present invention.

FIG. 6 is a structural diagram of a circuit showing a fourth embodiment of the present invention. Employing the technology of the present invention, a comparator for use in a batch conversion type A/D converter was constructed. A neuron MOS inverter was used; however, in order to simplify the explanation, the standard symbol for the neuron MOS is not employed; rather, the symbols of a common CMOS inverter and a capacitor element are employed. Reference 601 indicates a CMOS inverter, and references 602 and 603 indicate elements having capacities of, respectively, mC and $(2^n-m)C$. Reference 604 indicates a contact point connecting CMOS inverter 601 and capacitors 602 and 603. Using contact 604 as a floating gate, by means of CMOS inverter 601 and capacitors 602 and 603, a neuron MOS inverter having 2 input gate electrodes is formed. That is to say, contact point 604 is the floating gate of the neuron MOS inverter. If a number of these neuron MOS inverters equalling $2^n$ are disposed in parallel, then this forms the comparator of a n bit batch conversion type A/D comparator. In FIG. 6, for the purposes of simplicity, one comparator, numbered m, is isolated and depicted. References 605 and 606 indicate wires which supply signals to the two input coupling electrodes of the neuron MOS inverter which functions as a comparator; these are signal lines which are common to all comparators. References 607 and 608 indicate switches; these select either an analog voltage signal $V_{IN}$ which is the input of the A/D converter, or a maximum reference voltage $V_H$ and a minimum reference voltage $V_L$, as the signals supplied to the signal lines 605 and 606.

Switch 609 serves to reset the excess charge within the floating gate of the neuron MOS inverter; it is placed between the neuron MOS inverter output and the floating gate 604. The present embodiment represents an example of a semiconductor integrated circuit in which the contact point connected to the floating gate of the neuron MOS transistor via a switch element forms the output of an inverter circuit formed by the neuron MOS transistor itself.

The resetting of the excess charge within the floating gate of this neuron MOS circuit is accomplished in the following manner. During the reset period, the switch 609 is controlled so as to be in the ON position, and the floating gate 604 of the neuron MOS inverter, and the output of the inverter 601 as seen from the floating gate 604, are caused to conduct. Accordingly, the floating gate 604, that is to say, the input of the inverter 601, and the output of the inverter 601 are forcibly set to the same potential. That is to say, the floating gate 604 of the neuron MOS inverter is automatically biased at a voltage equivalent to the input and output of the inverter 601, that is to say, at the inversion threshold voltage $V_{IN}$ of the inverter 601. On the other hand, simultaneously with switch 609, switches 607 and 608 also move in a downward direction during the reset period, so that in other words, control is conducted so that $V_H$ is applied to wire 605, while $V_L$ is applied to wire 606. Accordingly, a voltage of $V_H$ is applied to the input side electrode of capacitor 602, while $V_L$ is applied to the input side of capacitor 603. If the electrostatic capacity of capacitor 602 is considered to be mC, and the electrostatic capacity of capacitor 603 is considered to be $(2^n-m)C$, then assuming a single input coupling capacity equivalent to the aggregated electrostatic capacity $2^nC$ of capacitor 602 and capacitor 603, an equivalent potential $V_{REF}$ is applied to the input side thereof, and this potential is given by the following formula:

(Arithmetical Formula 8) (8)

$$V_{REF} = V_L + \frac{m}{2^n}(V_H - V_L)$$

This equivalent potential $V_{REF}$ is the potential numbered m among a number of potentials $2^n$ or the like into which the range from the minimum reference voltage $V_L$ to the maximum reference voltage $V_H$ has been divided; it is the standard potential with respect to the comparator having the number m. The comparator employing the neuron MOS generates a standard potential by means of the principle of capacity division using the input coupling capacity of the neuron MOS. In the final analysis, during the reset period, potentials $V_{REF}$ and $V_{INV}$ are applied to both ends of an equivalent single input coupling capacity. When resetting is completed, switch 609 is opened, and the floating gate 604 is placed in an electrically floating state. Accordingly, a charge corresponding to the difference in potential between $V_{REF}$ and $V_{INV}$ during resetting remains in the floating gate 604. This could be termed a memory function, in which an analog potential is dynamically stored as a charge in the capacity. When the reset period is completed, switches 607 and 608 are also changed over, and an analog signal voltage $V_{IN}$ is connected to both wires 605 and 606. Accordingly, an analog signal input $V_{IN}$ is applied to the input side electrode of the equivalent single input coupling capacity. At this time, if the amount of charge remaining in the floating gate 604 is considered, then the potential $\Phi_F$ of the floating gate 604 is given by the following formula:

(Arithmetical Formula 9)

$$\Phi_F = V_{IN} - V_{REF} + V_{INV} \qquad (9)$$

Here, the parasitic capacity with respect to the floating gate 604 is assumed to be small and will be ignored. As can be seen from Formula 9, by means of adding a switch to the floating gate, and conducting control in the manner described above, it is possible to realize the subtraction of signals at the floating gate level. If $V_{IN}$ is smaller than $V_{REF}$, then the potential $\Phi_F$ of the floating gate becomes smaller than $V_{INV}$, and the inverter 601 outputs a value of 1. On the other hand, if $V_{IN}$ is larger than $V_{REF}$, then the potential $\Phi_F$ of the floating gate becomes larger than $V_{INV}$, inverter 601 inverts, and outputs a value of 0. That is to say, it is possible to execute a comparison between the input analog signal voltage $V_{IN}$ and the reference $V_{REF}$.

During the reset period, floating gate 604 is biased each time at the same potential, $V_{INV}$, so that it is possible to reset changes over time in the inversion threshold voltage of the neuron MOS inverter, as seen from the input coupling electrodes, which results from hot carrier injection and the like during calculation periods other than the reset period. Additionally, during the reset period, the floating gate 604 is reset to the inversion threshold potential $V_{INV}$, and during the comparison calculations, as well, a determination can be made as to whether the potential of the floating gate 604 is larger or smaller than the inversion threshold potential $V_{INV}$. That is to say, the inversion threshold value serves as a reference both during the reset period and the period of comparation calculations. Accordingly, even if the inversion threshold value $V_{INV}$ of the inverter exhibits variations among the individual comparators, this will not lead to errors during the comparation operations. Only the differential between the potential of the input coupling electrodes during resetting and the potential of the input coupling electrodes during comparation calculations is compared. That is to say, if the method described in the present embodiment is employed, then it is not merely possible to eliminate the changes over time in the inversion threshold voltage of the neuron MOS inverter, as seen from the input coupling electrodes, which results from the operation of the device, but also to eliminate variation in the inversion threshold value of the inverter as seen from the floating gate which can be traced to variations in the individual element parameters.

In the foregoing explanation, the case was given in which, during resetting, that is to say, while the switch 609 was in the ON position, a reference voltage was applied to the input coupling electrode of the neuron MOS, and an analog input signal was applied during comparation calculation operations; however, the opposite sequence is also acceptable. That is to say, it is possible to exert control so that an analog input signal voltage is applied during resetting, and the reference voltage is applied during the comparation calculations. At this time, the analog signal inputs are stored in the input coupling capacities, and a sample and hold function can be realized simultaneously during A/D conversion. This is effective when constructing subranging A/D converters.

(Fifth Embodiment)

Figure 7:
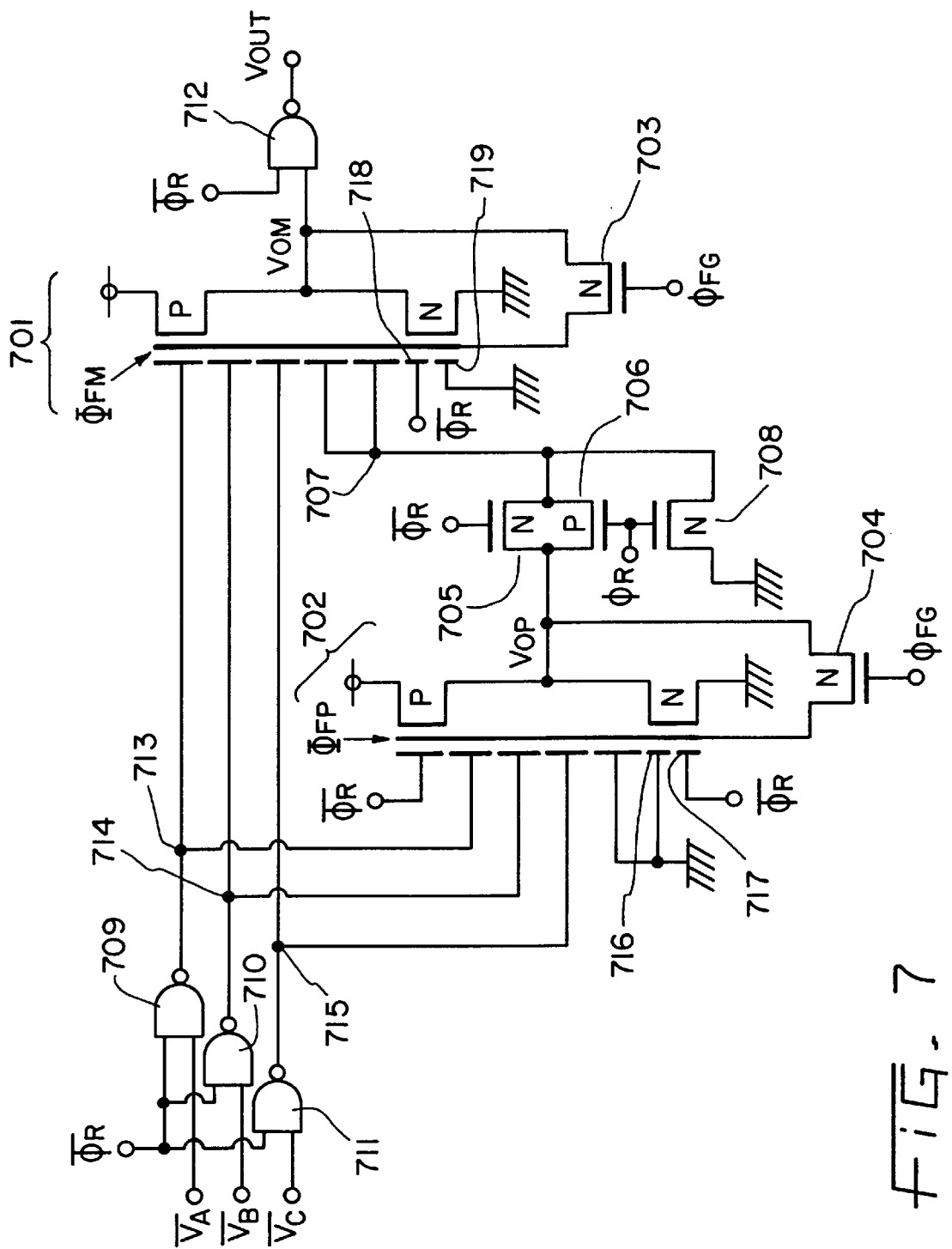
FIG. 7 is a schematic structural circuit diagram showing a fifth embodiment of the present invention.

FIG. 7 is a structural diagram of a circuit showing a fifth embodiment of the present invention. This circuit is an example of an application of the method described in the fourth embodiment, in which the floating gate and the output of a neuron MOS inverter are connected via a switch, and the floating gate charge is reset, to a neuron MOS logical circuit. This circuit calculates the exclusive OR (XOR) of three inputs. With the exception of the resetting mechanism, this circuit is identical to that of the third embodiment. References 701 and 702 indicate neuron MOS inverters. From the point of view of the structure, inverter 701 is termed the main inverter, while inverter 702 is termed a preinverter. Reference 703 and 704 indicate N channel MOS transistors which are employed as switch elements for the resetting of the excess charge in the floating gates of, respectively, neuron MOS inverters 701 and 702. These N channel MOS transistor switches are controlled by means of a control signal $\Phi_{FG}$, and conduct connection and disconnection between the floating gate and the output of the neuron MOS inverter. N channel MOS transistor 705 and P channel MOS transistor 706 form a CMOS switch which conducts connection and disconnection between the output of the neuron MOS inverter 702 and contact point 707, at which two of the input coupling electrodes of the neuron MOS inverter 701 are aggregated. Reference 708 indicates a N channel MOS transistor switch which serves to connect contact point 707, that is to say, two of the input coupling electrodes of the neuron MOS inverter 701, to a ground potential electrode. These switches are controlled by means of a control signal $\Phi_R$. References 709, 710, 711, and 712 indicate NAND gates.

The resetting operation is accomplished in the following manner. First, a switch connecting the floating gate and output of the neuron MOS inverter is placed in an ON position. By means of this, the floating gate is automatically biased at the inversion threshold value $V_{INV}$ of the inverter. Simultaneously, as a first signal group, the potentials of the plurality of input coupling electrodes of the neuron MOS inverter are controlled so that the average value thereof is equivalent to the logical threshold value, that is to say, $V_{DD}/2$. By means of this, a charge corresponding to the difference in potential between the logical threshold value $V_{DD}/2$ and the actual threshold value $V_{INV}$ of the inverter as seen from the floating gate is induced in the floating gate. Accordingly, it is possible to not only reset the changes over time in the amount of charge in the floating gate, but also to eliminate variations in the inversion threshold voltage $V_{INV}$ arising from errors in the parameters of the individual inverters. In other words, even if variation exists in the value of $V_{INV}$ in individual inverters, by means of the resetting method described in the present embodiment, the logical threshold values as seen from the input coupling electrodes can be accurately set to $V_{DD}/2$ in all neuron MOS inverters. Accordingly, the accuracy of the calculations of the neuron MOS logical circuit improves, the noise margin is improved, and it is possible to realize a logical circuit having a large number of inputs (having a large fan in).

Concretely, first, switches 703 and 704 are placed in the ON position, and the floating gates of the neuron MOS inverter 701 and 702 are biased at the inversion threshold value $V_{INV}$ of the inverter. In order that the average of the potentials of the input coupling electrodes reach a value of $V_{DD}/2$, among the input coupling electrodes capacitively coupled with the floating gate of the neuron MOS inverter, input coupling electrodes having half of the coupling capacity are set to $V_{DD}$, and the remaining half are set to the ground potential. In the example shown in FIG. 7, the input coupling electrodes connected to contact point 713, 714, and 715, to which the input signals $V_A$, $V_B$, $V_C$ of the circuit are applied during calculations, are all set to $V_{DD}$ during resetting, and the ground potential is applied to all other input coupling electrodes. NAND gates 709, 710, and 711 are employed as switches for the purpose of setting contact points 713, 714, and 715 to $V_{DD}$ during resetting, irrespective of the input signals. The CMOS switch comprising MOS transistors 705 and 706, and the N channel MOS transistor switch 708, cut the input coupling electrodes of neuron MOS inverter 701 and output of neuron MOS inverter 702 off from one another during resetting, and thus serve to apply the ground potential to the input coupling electrodes of neuron MOS inverter 701. In the case in which neuron MOS logical circuits are connected in a cascade manner, NAND gate 712 serves to bias the output of the previous stage circuit, that is to say, the input of the following stage circuit, to $V_{DD}$ during resetting. The purpose and function of NAND gates 709, 710, and 711 is identical. In this case, it is of course the case that it not necessary to provide the input portion NAND gates such as 709 or the like in following stage circuits.

Input coupling electrodes 716, 717, 718, and 719 have a coupling capacity which is half that of the other input coupling electrodes. These input coupling electrodes do not contribute anything to the calculations of the neuron MOS logical circuit themselves. Rather, these electrodes serve to adjust the weighted average value of all the input coupling electrode potentials during resetting so that this average value is equal to $V_{DD}/2$. Concretely, during resetting, the input coupling electrodes of 716, 717, 718, and 719 are all set to the ground potential. During calculations, the average potential of electrodes 716 and 717 and the average potential of electrodes 718 and 719 have the value of the logical threshold value $V_{DD}/2$, and these electrodes are completely unaffected by the results of the calculations. If contact points which are controlled so as to have the ground potential during resetting and have a potential of $V_{DD}/2$ during calculations are employed, then the input coupling electrodes 716 and 717, and 718 and 719, may be combined with one electrode having the same coupling capacity as the other input coupling electrodes.

In the present embodiment, in order to set the average of the potentials of the input coupling electrodes during resetting to a value of $V_{DD}/2$, among all the input coupling electrodes which were capacitively coupled with the floating gate of the neuron MOS inverter, the input gate electrodes connected to contact points 713, 714, and 715, which correspond to half of the coupling capacity, were set to $V_{DD}$, while the remaining half of the input coupling electrodes were set to the ground potential; however, such a method is not absolutely necessary, and the input coupling electrodes connected to contact point 713, 714, and 715 may be set to the ground potential while the other electrodes are set to $V_{DD}$, or, for example, execution may be conducted by applying a potential of $V_{DD}/2$ to all of the input coupling electrodes.

Figure 8:
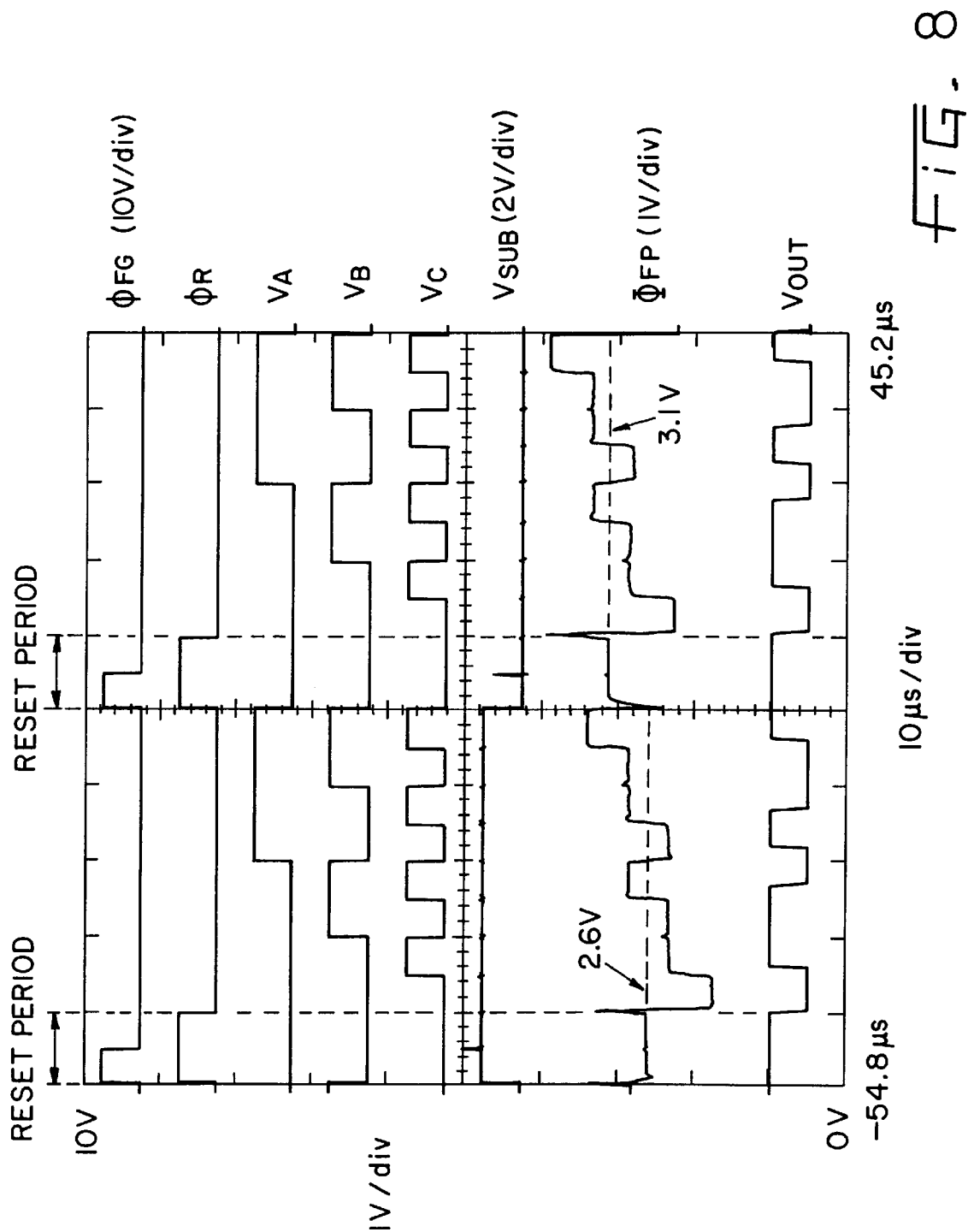
FIG. 8 shows the results of a measurement of the internal signal wave form of the inputs and output of a circuit in accordance with the fifth embodiment of the present invention.

FIG. 8 shows the results of the measurement of the input and output signal wave forms and the internal signal wave forms of the circuit shown in FIG. 7 in accordance with the present embodiment. $\Phi_{FP}$ indicates the floating gate potential wave form of the neuron MOS inverter 702. In the first reset period, it can be seen that the potential of the floating gate fluctuates about 2.6V in response to changes in the input signal, and it can be seen that calculations are being conducted. When the second reset period begins, the substrate bias voltage $V_{SUB}$ of the N channel MOS transistor comprising the neuron MOS inverter changes from 0V to −1V. By means of this operation, the inversion threshold value of the neuron MOS inverter as seen from the floating gate is forcibly changed from 2.6V to 3.1V; however, by means of the reset period, floating gate reset is conducted at the new inversion threshold value of 3.1V, and by means of this, the floating gate potential is shifted, and fluctuates about 3.1V. That is to say, this demonstrates that the divergence of the inversion threshold value of the inverter is automatically eliminated. The output $V_{OUT}$ of the circuit represents a normal exclusive OR (XOR) with respect to the three inputs $V_A$, $V_B$, and $V_C$, both after the first reset and after the second reset.

With respect to the end of the reset cycle, first the control signal $\Phi_{FG}$ falls, and the cycle comes to an end when $\Phi_R$ falls. Two types of control signals, $\Phi_{FG}$ and $\Phi_R$, are used; however, in consideration of the transmission delay and the like of the wiring, if the structure is such that the timing at which the floating gate switches 703 and 704 are opened is sufficiently delayed with respect to that of the other switches, then the same control signal may be employed for both.

The switch elements which were employed in the present embodiment were N channel MOS transistors, CMOS switches, and NAND gates; however, this is not necessarily so limited, and in so far as the switching function is carried out, this may be accomplished by means of slight modifications in the circuit connections which do not affect the essential circuit operations of the present invention.

Here, the present embodiment was explained using as an example a neuron MOS logical circuit which calculated the XOR function of three inputs; however, this is not necessarily limited a three input XOR function, but may be more broadly applied to all neuron MOS logical circuits.

(Sixth Embodiment)

Figure 9:
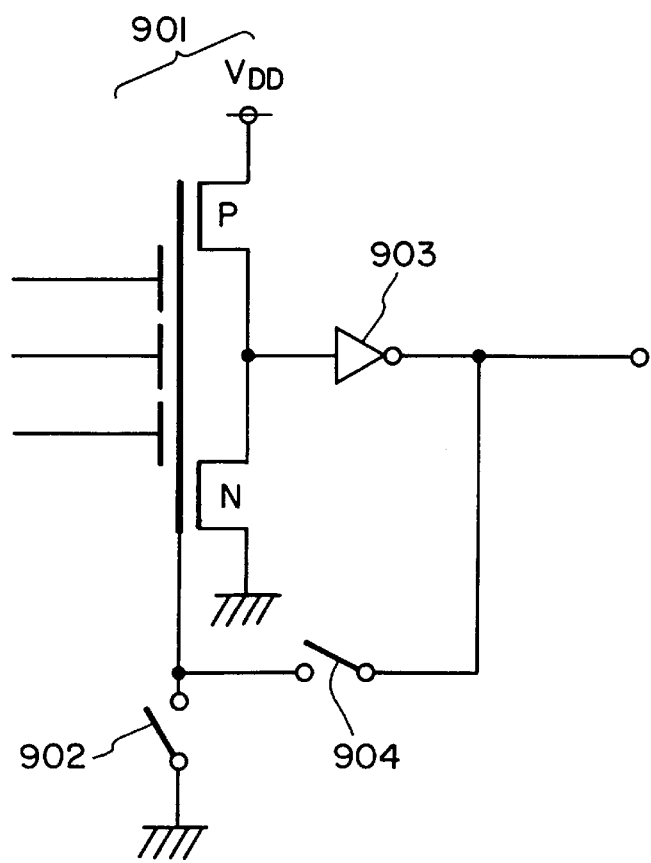
FIG. 9 is a schematic structural diagram showing a sixth embodiment of the present invention.

FIG. 9 shows a sixth embodiment of the present invention. Reference 901 indicates a neuron MOS inverter, and reference 902 indicates a switch for resetting the charge in the floating gate of the neuron MOS inverter 901. Reference 903 indicates a common inverter which is connected to the output of the neuron MOS inverter 901. After being logically inverted by inverter 903, the output of neuron MOS inverter 901 is connected to the floating gate of that same inverter via a switch 904. A circuit block corresponding to a reset mechanism is connected to the input coupling electrodes of the neuron MOS inverter 901, so that there are cases in which the switch elements are as in the first embodiment (FIG. 1), and cases in which the output of a portion of the neuron MOS circuit is connected as in the third embodiment (FIG. 4). The previous stage circuit to this neuron MOS inverter 901 is not relevant to the discussion of the present embodiment, so that it is omitted.

With respect to the resetting of the remaining charge in the floating gate of the circuit shown in the present embodiment, this is the same as in the circuit of the second embodiment, and a method in which the floating gate is biased at the ground potential during resetting is adopted. During resetting, switch 902 is placed in the ON position, while switch 904 is placed in the OFF position. When the reset period ends and while the circuit executes logical calculations, both switches 902 and 904 are in the OFF position. The operations to this point are identical to those in the case of the second embodiment.

After calculations are completed and the output $V_{OUT}$ of the circuit is determined, the switch 904 is placed in an ON state, and thereby, the logical inversion of the output of the circuit, that is to say, the output of the neuron MOS inverter 901 itself, is fed back to the floating gate of the neuron MOS inverter 901. At a point in time prior to the placing of the switch 904 in the ON position, if the potential of the floating gate of the neuron MOS inverter 901 is larger than the inversion threshold value $V_{INV}$ as seen from the floating gate, then the output of the neuron MOS inverter 901 is 0, and the circuit output, the wave form of which is inverted by inverter 903, is 1, that is to say, a potential of $V_{DD}$. By means of placing switch 904 in the ON position, this potential $V_{DD}$ is applied to the floating gate of the neuron MOS inverter 901. Originally, the potential of the floating gate of the neuron MOS inverter 901 was larger than $V_{INV}$; however, this is furthered, and the potential finally reaches $V_{DD}$. On the other hand, if at a point in time prior to the placing of the switch 904 in the ON position, the potential of the floating gate of neuron MOS inverter 901 is smaller than $V_{INV}$, then by placing switch 904 in the ON position, the ground potential is applied to the floating gate of the neuron MOS inverter 901. By means of placing the switch 904 in the ON position, when a potential of $V_{DD}$ or the ground potential is applied at a low impedance to the floating gate of the neuron MOS inverter, then the loop formed by the neuron MOS inverter 901, the common inverter 903 and the switch 904 is capable of stably maintaining this value. That is to say, when switch 904 is placed in the ON position and a feedback loop is formed, thereinafter, no matter how the potential of the input coupling electrodes of the neuron MOS inverter changes, the output state at the point in time at which the feedback loop was formed can be maintained. In this neuron MOS circuit, it is possible to realize a latching function which maintains the logical state at this time. The resetting of the maintained state can be realized by means of a method identical to the standard method for resetting charge remaining in the floating gate.

In the neuron MOS logical circuit, the floating gate of the neuron MOS transistor handles multivalent data, so that the logical swing becomes small, the potential of the floating gate is constantly biased in the vicinity of the transition region of the inverter, and as a result, a through type current always flows, and the power consumption of the circuit greatly increases. Using the method discussed in the present embodiment, after feedback is applied to the floating gate, the potential of the floating gate becomes $V_{DD}$ or the ground potential, so that fundamentally, a through type current does not flow in the CMOS inverter. Accordingly, this is effective for the reduction of power consumption.

In the present embodiment, a resetting method was described in which both the input coupling electrode of the neuron MOS and floating gate were biased at the ground potential; however, additionally, it is of course the case that many other variations are possible, such as a method in which both are reset to a potential of $V_{DD}$. A standard inverter 903 was employed as a circuit for the logical inversion of the output of the neuron MOS inverter 901; however, it is of course the case that other circuits may be employed, such as, for example, NAND or NOR gates or the like. Furthermore, the output of the standard inverter 903 was outputted as the output of the circuit; however, it is of course the case that the output of the neuron MOS inverter 901 may be employed as the output of the circuit.

Industrial Applicability

In accordance with the invention as stated in claim 1, in an integrated circuit employing neuron MOS transistors, the charge remaining in the floating gate during device manufacture, and the injection charge in the floating gate resulting from device operation, can be effectively reset, and errors in operation of the circuit resulting from the floating gate charge can be prevented, so the reliability of the neuron MOS integrated circuit can be improved. Furthermore, the accuracy of calculation with respect to multivalent signals using the floating gate is improved, and the noise margin is increased, so it is possible to conduct calculations having more functions.

In accordance with the invention as stated in claim 2, in a neuron MOS logical circuit, it is possible to realize, in particular, an improvement in the reliability and the function.

In accordance with the invention as stated in claim 3, it is possible to realize an improvement in reliability and the function of, in particular, an analog circuit using neuron MOS transistors.

In accordance with the invention as stated in claim 4, it is possible to realize an improvement in the reliability and function of neuron MOS integrated circuits, and it is possible to realize a simplification in the circuitry in a portion of the circuit.

In accordance with the invention as stated in claim 5, it is possible to realize an improvement in the reliability and function of, in particular, a neuron MOS logical circuit. For example, if the output of a certain logical circuit A is connected to the floating gate of a neuron MOS transistor contained in a neuron MOS logical circuit B via a switch, then based on the results of the calculation of the logical circuit A, it is possible to change over the calculation function of the neuron MOS logical circuit B, and thus possible to realize a logical circuit having higher functions.

In accordance with the invention as stated in claim 6, it is possible to realize an improvement in the reliability and function of, in particular, a neuron MOS logical circuit, and it is possible to construct a feedback loop within the circuit, and thus to realize a wider variety of functions.

In accordance with the invention as stated in claim 7, it is possible to eliminate the variation in the threshold value of the individual transistors, and it is thus possible to greatly increase the accuracy of calculation, the reliability and function.

In accordance with the invention as stated in claim 8, it is possible to realize an improvement in the reliability and function of, in particular, a neuron MOS logical circuit, and it is possible thus to construct a latch circuit which logically maintains the input data, results of calculations, or the like.

We claim:

1. A semiconductor integrated circuit comprising:

a neuron MOS transistor, said transistor having a semiconductor region of a first conductivity type, source and drain regions of opposite conductivity types provided in said semiconductor region, and a floating gate separated from said source and drain regions by an insulating film;

a plurality of input coupling electrodes capacitively coupled with said floating gate by means of a insulating film;

a switching element interconnecting said floating gate and a signal line, whereby, when a fist signal group is inputted to said plurality of input coupling electrodes and said switching element is closed to electrically connect said floating gate and said signal line, and said switching element is thereafter opened so that said floating gate in placed in an electrically floating state, calculations may be effected by inputting a second signal group to said plurality of input coupling electrodes.

2. A semiconductor integrated circuit in accordance with claim 1, wherein said neuron MOS transistor comprises an inverter circuit.

3. A semiconductor integrated circuit in accordance with claim 2, wherein said signal line is connected to a contact point of a potential divider circuit by means of a resistance element.

4. A semiconductor integrated circuit in accordance with claim 2, wherein said signal line is connected to an output terminal of the logical circuit.

5. A semiconductor integrated circuit in accordance with claim 1, wherein said neuron MOS transistor comprises a source follower circuit.

6. A semiconductor integrated circuit in accordance with claim 5, wherein said signal line is connected to a contact point of a potential divider circuit by means of a resistance element.

7. A semiconductor integrated circuit in accordance with claim 5, wherein said signal line is connected to an output terminal of the logical circuit.

8. A semiconductor integrated circuit in accordance with claims 1 wherein said signal line is connected to a contact point of a potential divider circuit by means of a resistance element.

9. A semiconductor integrated circuit in accordance with claims 1 wherein said signal line is connected to an output terminal of a logical circuit.

10. A semiconductor integrated circuit in accordance with claim 9, wherein the output value of said logical circuit is determined by said neuron MOS transistor.

11. A semiconductor integrated circuit in accordance with claim 10, wherein said logical circuit is an inverter circuit formed by said neuron MOS transistor.

12. A semiconductor integrated circuit in accordance with claim 11, wherein said logical circuit is structured so as to output a signal representing an inversion of the output of said inverter circuit.

* * * * *